US005302102A

United States Patent [19]

Haimer

[11] Patent Number: 5,302,102

[45] Date of Patent: Apr. 12, 1994

[54] EQUIPMENT FOR BRIQUETING VEGETAL MATERIAL IN PARTICULAR STALK-PLANT MATERIALS

[76] Inventor: Franz Haimer, Weiherstrasse 21, D-8894 Igenhausen, Fed. Rep. of Germany

[21] Appl. No.: 690,951

[22] PCT Filed: Mar. 15, 1990

[86] PCT No.: PCT/EP90/00427

§ 371 Date: May 9, 1991

§ 102(e) Date: May 9, 1991

[87] PCT Pub. No.: WO91/04150

PCT Pub. Date: Apr. 4, 1991

[30] Foreign Application Priority Data

Sep. 15, 1989 [EP] European Pat. Off. ....... 89 117142.3

[51] Int. Cl.⁵ ............ B29C 47/00

[52] U.S. Cl. ............ 425/135; 100/145; 425/149; 425/203; 425/205; 425/208; 425/378.1; 425/461

[58] Field of Search ............ 100/144, 145; 425/185, 425/203, 135, 140, 205, 208, 359, 360, 376.1, 149, 378.1, 461, 466, DIG. 230

[56] References Cited

U.S. PATENT DOCUMENTS

| | | | |
|---|---|---|---|
| 1,353,917 | 9/1920 | Lambert . | |
| 1,467,737 | 9/1923 | Schueler | 100/145 |
| 1,577,015 | 3/1926 | Glaze | 425/466 |
| 2,026,439 | 12/1935 | Sanial . | |
| 2,547,151 | 4/1951 | Braeseke | 425/378.1 |
| 2,943,012 | 6/1960 | Dunning et al. | 100/145 |
| 2,977,873 | 4/1961 | Crane . | |
| 2,984,173 | 5/1961 | Roche . | |
| 3,034,424 | 5/1962 | Zies | 100/145 |
| 3,044,391 | 7/1962 | Pellett . | |
| 3,102,716 | 9/1963 | Frenkel | 100/145 |
| 3,126,820 | 3/1964 | Upton | 100/145 |
| 3,323,444 | 6/1967 | Mark . | |
| 3,956,981 | 5/1976 | Pitt . | |
| 4,632,795 | 12/1986 | Huber et al. | 425/466 |
| 4,698,006 | 10/1987 | Ralphs | 425/185 |

FOREIGN PATENT DOCUMENTS

| | | | |
|---|---|---|---|
| 602126 | 7/1960 | Canada | 425/376.1 |
| 910712 | 9/1972 | Canada . | |
| 0129856 | 1/1985 | European Pat. Off. . | |
| 0141821 | 9/1987 | European Pat. Off. . | |
| 0359285 | 3/1990 | European Pat. Off. . | |
| 42963 | 4/1888 | Fed. Rep. of Germany . | |
| 80010 | 3/1895 | Fed. Rep. of Germany . | |
| 119916 | 9/1899 | Fed. Rep. of Germany . | |
| 490892 | 2/1930 | Fed. Rep. of Germany . | |
| 627048 | 3/1936 | Fed. Rep. of Germany . | |
| 1122462 | 1/1962 | Fed. Rep. of Germany . | |
| 1180188 | 10/1964 | Fed. Rep. of Germany . | |
| 1517064 | 9/1969 | Fed. Rep. of Germany . | |

(List continued on next page.)

OTHER PUBLICATIONS

Patent Abstracts of Japan, vol. 6, No. 210, Oct. 1982.

*Primary Examiner*—Charles S. Bushey
*Attorney, Agent, or Firm*—Nikaido, Marmelstein, Murray & Oram

[57] ABSTRACT

Equipment for briqueting plant stalk-produce, includes a conical-screw compactor, a tubular press-cavity, an annular degassing device and a control device including a molding pressure sensor. The annular degassing device adjoins a discharge aperture of a compactor space with a plurality of narrow-axial degassing slits open to the atmosphere, which issue into the discharge aperture of the compactor space.

23 Claims, 4 Drawing Sheets

U.S. PATENT DOCUMENTS

| | | | |
|---|---|---|---|
| 2030784 | 12/1971 | Fed. Rep. of Germany . | |
| 2232006 | 1/1974 | Fed. Rep. of Germany . | |
| 3129788 | 2/1983 | Fed. Rep. of Germany . | |
| 3305487 | 9/1983 | Fed. Rep. of Germany . | |
| 3220916 | 12/1983 | Fed. Rep. of Germany . | |
| 3342812 | 6/1984 | Fed. Rep. of Germany . | |
| 3306270 | 8/1984 | Fed. Rep. of Germany . | |
| 3422658 | 12/1985 | Fed. Rep. of Germany . | |
| 451305 | 4/1913 | France . | |
| 879670 | 3/1943 | France . | |
| 57-116000 | 7/1982 | Japan . | |
| 261187 | 8/1949 | Switzerland | 425/376.1 |
| 70014 | 12/1948 | U.S.S.R. . | |
| 114302 | 3/1957 | U.S.S.R. . | |
| 670455 | 6/1979 | U.S.S.R. . | |
| 1006257 | 3/1983 | U.S.S.R. | 425/376.1 |
| 17789 | of 1911 | United Kingdom . | |
| 26713 | of 1914 | United Kingdom . | |
| 287019 | 4/1928 | United Kingdom . | |
| 505231 | 6/1939 | United Kingdom . | |
| 1081614 | 8/1967 | United Kingdom . | |
| 1100236 | 1/1968 | United Kingdom . | |
| 84/01125 | 3/1984 | World Int. Prop. O. . | |
| 8403252 | 8/1984 | World Int. Prop. O. . | |
| 84/03661 | 9/1984 | World Int. Prop. O. . | |

EQUIPMENT FOR BRIQUETING VEGETAL MATERIAL IN PARTICULAR STALK-PLANT MATERIALS

FIELD OF THE INVENTION

The invention concerns equipment defined in the preamble of claim 1 for briqueting plants, especially stalk-plant materials.

BACKGROUND OF THE INVENTION

The German Offenlegungsschrift 34 22 658 discloses straw briqueting equipment with a screw compactor of which the driven, rotating screw evinces an outer contour at its front end, as seen in the direction of advance, determined by two screw coils away from a conical screw core. The conical segment of the otherwise cylindrical screw enters a conical compaction space of a screw housing entered by the cantilevered worm. A hopper feeding the straw to be briqueted is mounted above the cylindrical part of the screw and said straw is compacted by said rotating screw in the conical screw segment and is expelled through a discharge opening at the tapered end of the conical surface of the screw housing. The pressure of the conical screw compactor can be controlled by a tubular, cross-sectionally adjustable punch adjoining the discharge of the conical surface.

The straw to be briqueted is highly compressed by the pressure from the conical screw compactor and heats up in this process and on account of its lignin content cakes into a straw cake which even when hot flows only poorly. Because accumulation may take place especially at the transition from the inner cone of the screw housing to the cavity, whereby the discharge aperture of the conical worm compactor would clog, an axially displaceable plunger is mounted in the screw of the German Offenlegungsschrift 34 22 658 to periodically expel the accumulating compacted straw into the cavity. However it has been found that the straw lignin not only makes possible briqueting, but also bonds the plunger guided displaceably in the screw to this screw until it can no longer move. The known equipment therefore can be operated only during comparatively short intervals before requiring disassembly and cleaning.

The object of the invention is to create equipment of the species in such manner that continuous operation unlikely to incur malfunctions shall be achieved.

This problem is solved by the features of present invention.

SUMMARY OF THE INVENTION

The invention starts with a guide strip mounted on the inside conical surface of the screw housing of the known equipment and projecting toward the screw. In the known equipment, several guide strips are present on the conical inside surface and extend in the axial direction of the screw, to prevent rotation of the straw cake during compaction. The invention deviates from this principle and permits rotation of the straw cake in the conical screw compactor. The guide strip encloses the screw in the form of a conical coil of which the winding direction is opposite the winding direction of the screw, whereby the guide strip drives the rotating straw cake in screwing manner toward the discharge opening of the inner cone of the screw housing and assures uniform evacuation toward the die. The press punch or the like provided in the known equipment therefore may be eliminated.

The expression "guide strip" herein means an elongated component capable of acting like a screw in the direction of conveyance on the rotating stalk materials to be compacted. The component in particular may assume the shape of a rib or a bridge illustratively integrated into the screw housing or being created in it by suitable grooves.

The equipment of the invention is suitable for briqueting plant-materials of all kinds and consistency, in particular also wood wastes such a chips and saw dust; but especially this equipment is used for briqueting stalk plants, especially dry goods such as straw.

As a rule the inner conical surface of the screw housing extends in the direction of conveyance of the screw beyond the screw. In this manner there remains in the screw housing and in front of the screw a tapering chamber through which the screw's pressure must force the already compacted straw. This is substantially facilitated if the guide strip extends as far as the region of the inner conical surface projecting beyond the screw and appropriately reaches as far as the discharge opening. It is easily seen that the conical coil where called for also may be a multi-spiral coil consisting of several conical coils.

Stalk-plant goods, in particular straw, must be compacted at a comparatively high volume ratio when being briqueted. In the briqueting equipment known from the German Offenlegungsschrift 34 22 658, a screw pre-compactor is coaxially associated with the conical screw compactor and is loaded from above through a hopper with stalk-plant material. The screws of the conical screw compactor and of the screw pre-compactor are on a common body and therefore the equipment is quite long.

To reduce size, a preferred embodiment of the invention provides that the screw of the conical screw compactor be approximately conical over its entire length of conveyance and that the screw pre-compactor directly connects, with its screw axis being transverse and in particular perpendicular to the screw axis of the conical screw compactor, to an intake opening in the screw housing of the conical screw compactor. The resulting already comparatively compact system is further made smaller when reducing the size of the screw pre-compactor by placing a pre-compressing system of rolls on that side of the screw pre-compactor where the discharge opening of the conical screw compactor is located, said system of rolls comprising at least two axially parallel compression rolls driven in opposite directions and pre-compressing between them the stalk-plant material and inserting it into an intake opening of the screw pre-compactor transversely to its screw axis. The straw to be compacted is supplied for instance by a conveyor belt on the side of the pre-compression roll-system, or roll-assembly, away from the screw pre-compactor and during the advance-and-compaction process moves over an essentially U-shaped path along which the particular processing components can be mounted relatively tightly against each other. The two pre-compression rolls in this case may be superposed so their axes are parallel and where called for may be mutually adjustable, and moreover a roller with beating strips mounted above the conveyor belt and driven into rotation and depending on its direction of rotation may assure additional pre-compression or else may smooth the feed rate.

Because of the compaction by the conical screw compactor, the straw often is heated so much that its water proportion evaporates at least in part. Because of the accumulation, the vapor pressure near the discharge opening of the conical screw compactor may increase so much that the equipment may be damaged by excess pressure. Moreover there is danger that because of excessive vapor pressure the compacted straw shall be explosively driven out of the die. To prevent damage and dangers of this kind, a preferred embodiment provides an annular component between the discharge opening of the conical compaction chamber of the conical screw compactor and the die adjoining the discharge opening in the direction of conveyance, with a plurality of venting ducts that open into the ambient being present on the inside surface of said annular component. These venting ducts are very narrow capillaries, for instance about a tenth of a millimeter wide, which allow the generated vapor to escape. The annular component appropriately is made by spark machining.

The venting ducts on the whole shall admit only vapor and possibly also fine dust. They may be in the form of axial slits which, in order to improve vapor venting, merge into axially extending wide drain ducts radially above. Whereas the venting ducts are sealed at the two axial end faces of the annular component by abutting surfaces of adjoining parts, the drain ducts are open toward the ambient at least at one end face of the annular component, and where called for the adjacent component, illustratively the screw housing the conical screw compactor, may comprise an annular duct open toward the ambient.

In order to facilitate manufacture of the annular component, appropriately it shall not be an integral part of the screw housing of the die, but instead it is seated as a separate part in a chamber of a die-pipe of the die, said chamber being open toward the screw housing of the conical screw compactor.

The die adjoining the discharge of the conical screw compactor of the equipment known from the German Offenlegungsschrift 34 22 658 comprises a die-pipe of the same axis as the cone axis of the conical screw compactor and divided by two axial slots in two halves, its discharge cross-section being varied as needed by a radially acting, hydraulic pair of tongs. The discharge cross-section of such a die however is only roughly adjustable. Moreover the adjustment of the discharge cross-section requires a comparatively high and permanent hydraulic pressure.

More precise adjustment of the discharge cross-section at lesser setting forces can be achieved by providing wedge surfaces on the outside of the die-pipe divided by axial slots into radially displaceable tongues, where these wedge surfaces are jointly enclosed by a clamping ring. The clamping ring and the die-pipe are relatively displaceably guided in the axial direction and are mutually spring-loaded toward each other in the axial direction. The adjustment drive formed by the clamping ring and the wedge surfaces displaces the clamping ring against the spring force. The slanting angle of the wedge surfaces preferably is selected in such manner that self-locking takes place so that the adjustment drive no longer absorbs the straw pressure. The force which must be applied by the adjustment drive may be lowered further if the springs pre-stress the clamping ring and the die-pipe opposite one another in the sense of reducing the discharge cross-section of the die. This die design also may be used in other than the above discussed equipment for stalk-plant material briqueting.

In a first variation of the die, the die-pipe is rigidly joined to the screw housing and a machine base for the conical screw compactor. Several springs are distributed around the circumference of the die-pipe and rest on one hand on a support flange of the die-pipe and on the other hand on the heads of axial tension rods rigidly joined to the die or the machine base. Such a die needs comparatively few components.

In a second variation the die-pipe and the screw housing of the conical screw compactor form one sub-assembly displaceably guided in the axial direction of the screw relative to this screw and to the machine base. This variation offers the advantage that it is possible both to vary the discharge cross-section of the die and the clear inside volume of the conical screw compactor. The wedge surfaces are arranged in such manner that when the discharge cross-section of the die is widened, the screw housing can be removed in the conveyance direction of the screw from this screw. As a result the pressure in the compaction chamber drops at once after the adjustment because of the widening of the compaction chamber and instantaneously supports the relief effect of the opening die. In the reverse case when the die is being closed, the pressure rise in the compaction chamber is accelerated.

Appropriately the conical screw compactor comprises a compression sensor and the adjustment drive shall be controlled by this sensor. The compression sensor may respond to the actual pressure between the screw and the screw housing, but it will be simpler in design if it measures the compression by means of an indirect parameter such as the drive torque of the screw of the conical screw compactor.

As regards the above discussed die-pipes, the material packed in the die-pipe is expelled at the pipe end opposite the discharge opening by means of the conveyance pressure from the conical screw compactor. Accordingly the length of the die-pipe must be such that the compacted material has cooled into a solid mass at its discharge end. This presupposes comparatively long die-pipes.

Accordingly the embodiment of the invention discussed below is especially significant also for briqueting equipment other than the above kind. In this embodiment of the invention, a revolving die is mounted in front of the discharge opening of the conical screw compactor, comprising die-pipes mounted on a common rotatably supported turret and individually aligned in sequence with the discharge opening. The revolving die also comprises an expulsion station circumferentially offset from the discharge opening along the turret. The revolving die comprises a plurality of die-pipes dimensioned solely with respect to briqueting and achieving adequately high retention pressure in the conical screw compactor, so that control of briqueting is facilitated because compacting takes place independently of expulsion.

Appropriately the turret comprises a stationary closing wall axially opposite the discharge opening of the conical screw compactor and closing at least the particular die-pipe aligned with the discharge opening on the side away from same. Together with the closing wall the die-pipe forms a chamber receiving the material from the screw compactor and preferably already the final size of the briquet to be made. In this manner the division stage required in the above discussed open-end die-pipes. Appropriately the end rim of each die-pipe facing the discharge opening forms an annular blade that cuts off the string of material issuing from the discharge opening of the conical screw compactor when the turret is being moved.

In an appropriate embodiment the die-pipes are mounted circumferentially spaced on the turret and form between them open cooling vents. A cooling-air blower moves cooling air radially from the inside to the outside through these vents, whereby the briqueted material can cool while being moved stepwise toward the discharge station. For that purpose the discharge station is angularly offset in the direction of conveyance by as large as possible a number of die-pipes relative to the position of the discharge opening of the conical screw compactor.

A possibly hydraulically driven ratchet stepping device was found suitable for the stepwise drive of the turret.

The illustrative embodiments of the invention are elucidated below in relation to a drawing.

DESCRIPTION OF THE PREFERRED EMBODIMENTS

Figure 1:
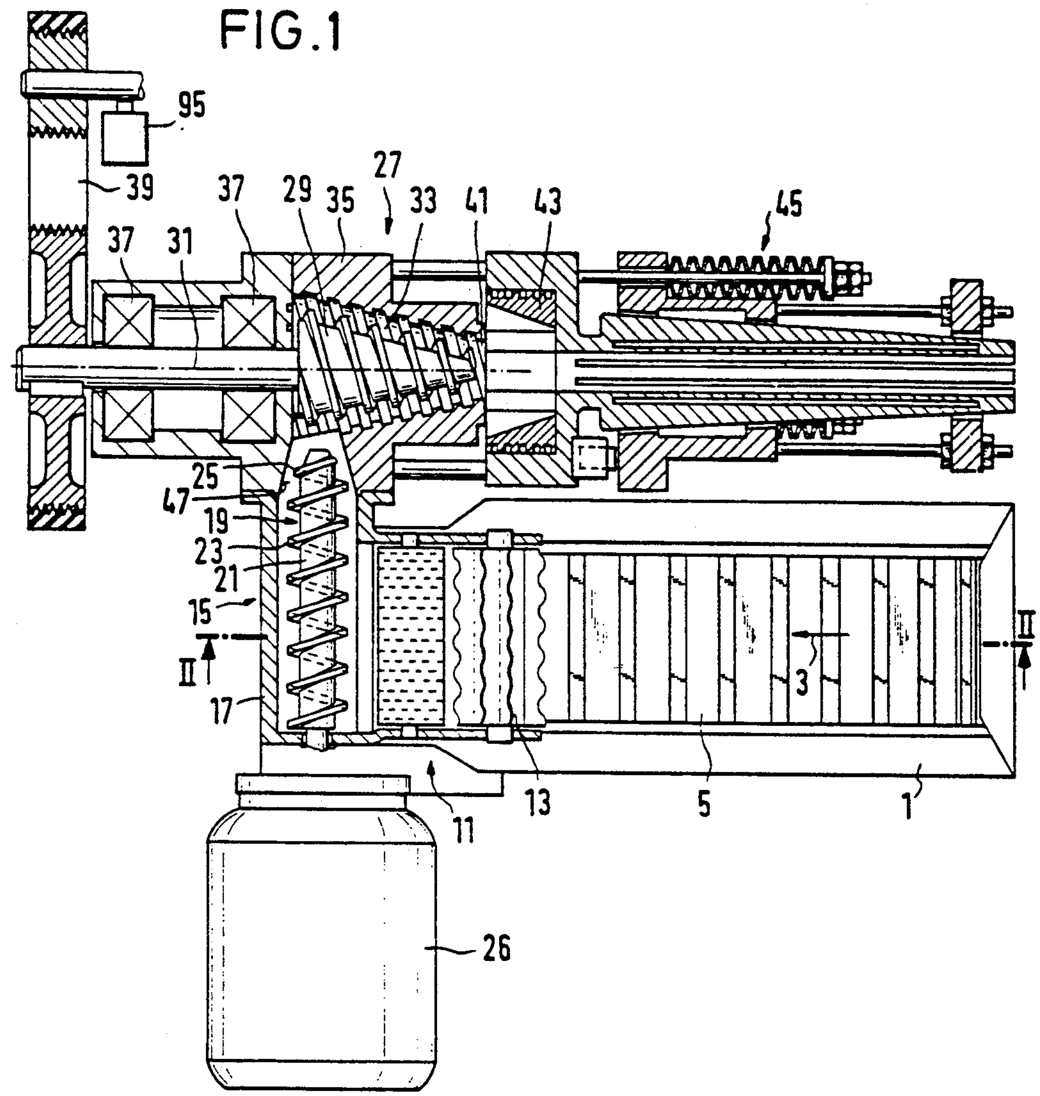
FIG. 1 is a partial schematic sectional elevation of equipment for briqueting stalk-plant material, especially straw.
Figure 2:
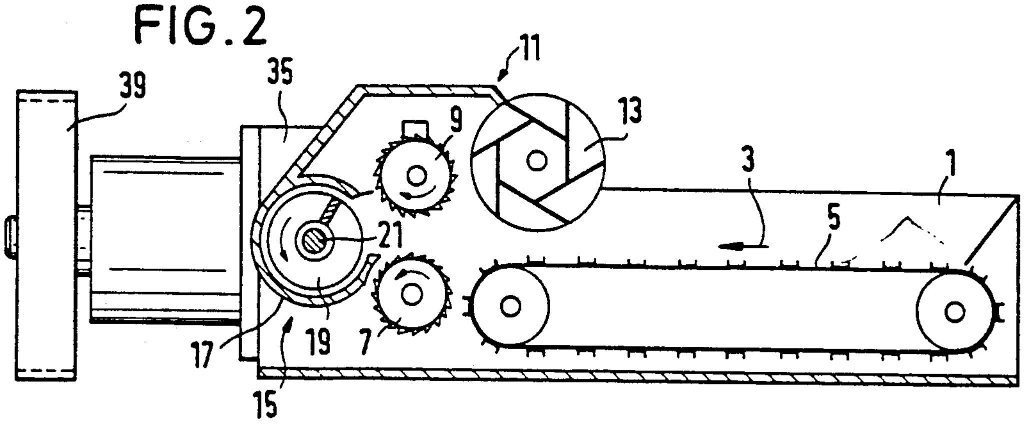
FIG. 2 is a sectional elevation of the equipment seen along a line II—II in FIG. 1.

FIGS. 1 and 2 show briqueting equipment allowing to compact loosely poured, but previously not substantially comminuted or ground straw into high density straw briquets of at least 0.5 kg/dm$^3$. The straw is placed through a hopper 1 on an endless conveyor belt 5 moving in the direction of the arrow 3 and conveying this straw between two superposed pre-compression rolls 7, 9 of horizontal axes of a pre-compressing roll assembly denoted overall by 11. The pre-compression rolls 7, 9 equipped at their peripheries with gripping teeth, strips or the like are driven in opposite directions. Illustratively the upper pre-compression roll 9 is vertically guided in arms not shown in further detail and is pre-stressed by springs or weights against the pre-compression roll 7. A strip-equipped roll 13 is mounted near the pre-compression roll 9 above the conveyor belt 5 and is driven in the same sense as the pre-compression roll 9 and assures further pre-compaction of the straw introduced by the conveyor belt 5 between the pre-compression rolls 7, 9. Alternatively the strip-equipped roll 13 may be driven in opposite rotation, in which event it serves as a comb-roll and assures even straw flow on the conveyor belt 5. A screw pre-compactor 15 mounted with a compacting screw 19 mounted in a screw housing 17 so its axis is parallel to the pre-compression assembly 11 adjoins the discharge side of the pre-compression assembly 11. The screw pre-compactor 15 deflects the pre-compressed straw moved in the direction of the arrow 3 in the axial direction of the compaction screw 19 and assures further straw compaction. The compaction screw 19 comprises an essentially cylindrical screw shank 21 and at least one single winding screw coil 23 conically tapering at its discharge end 25. A motor 26 drives the screw pre-compactor 15, the pre-compression roll assembly 11, the strip-roll 13 and possibly the conveyor belt 5. The above discussed components assure substantial straw pre-compaction, which however is inadequate for briqueting.

Briqueting takes place in a conical screw compactor 27 of which the conical screw 29 with the screw axis 31 orthogonal to the axis of the pre-compacting screw 19 is mounted in a conical compacting chamber 33 of a screw housing 35 rigidly joined to the screw housing 17. The conical screw 29 cantilevered by means of a bearing 37 on the screw housing 35 or a machine base is powered by a belt-drive 39 in turn powered by a motor not shown here in further detail. The conical compacting chamber 33 issues an axial distance away from the free end of the conical screw 29 into a discharge opening 41 adjoined in manner further discussed below by a venting ring 43 and a die 45 having a hydraulically controlled discharge cross-section. The conical screw compactor 27 receives the pre-compacted straw directly from the screw pre-compactor 15 of which the compacting screw 19 enters—for this purpose and by its end 25, in the region of the end with larger diameter of the conical screw 29—a conical intake opening 47 of the screw housing 35. The direction of conveyance of the conical screw compactor 27 is horizontal and opposite the direction of conveyance 3 of the conveyor belt 5. This results in an essentially U-shaped processing path, the parts of the straw-briqueting equipment lending themselves to be mounted within a comparatively confined space.

Figure 3:
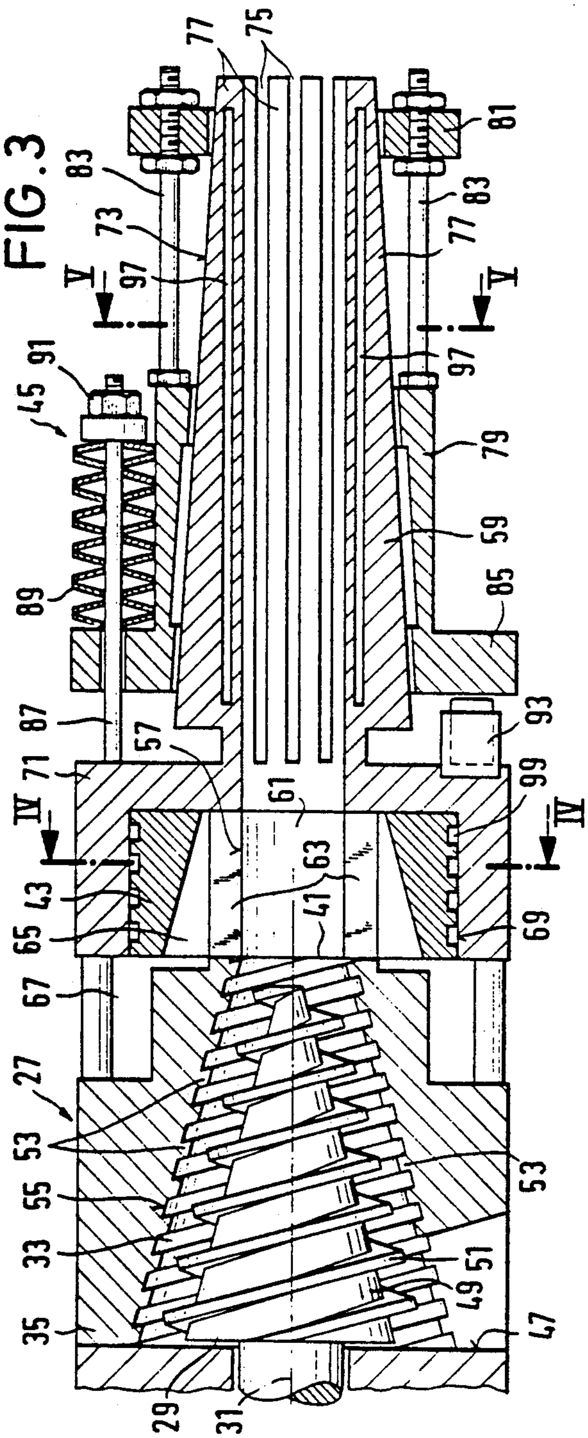
FIG. 3 is an enlargement of part of the equipment of FIG. 1.
Figure 5:
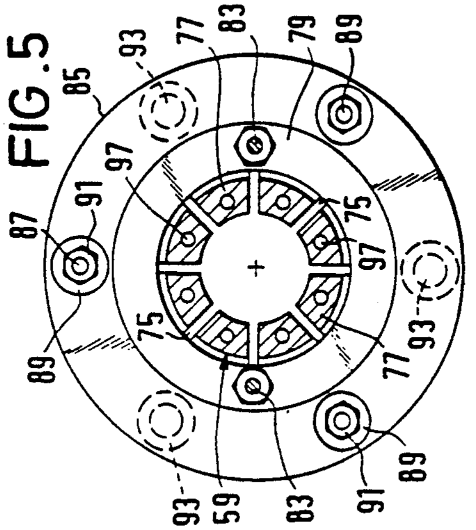
FIG. 5 is a cross-section of the equipment along line V—V of FIG. 3.
Figure 4:
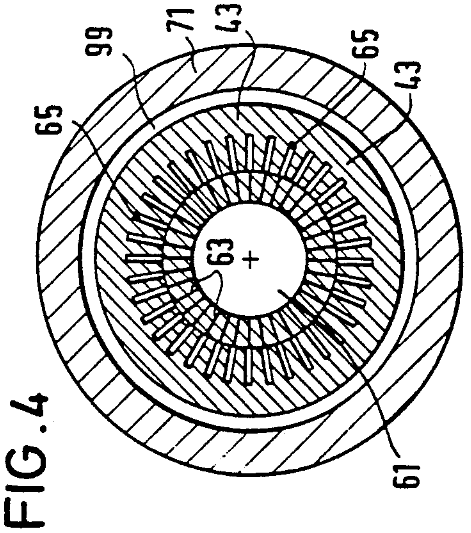
FIG. 4 is a cross-section of the equipment along a line IV—IV of FIG. 3.

FIGS. 3 through 5 show details of the conical screw compactor 27, the venting ring 43 and the die 45. The conical screw 29 of the conical screw compactor 27 comprises a frustoconical screw shank 49 from which a single or multiple coil 51 with a frustoconical contour project(s) radially. The conical compacting chamber 33 is bounded radially outward by an inside conical surface 55 equipped with radially projecting strips or ribs 53 and extending in the direction of conveyance of the conical screw 29 beyond said screw's tapered end as far as the discharge opening 41, also comprising ribs 53 is this area. The ribs 53 enclose the conical screw 29 in the form of a single or multiple coil of which the direction of winding is opposite that of the screw turns 51 and which may be bounded by grooves or formed by them in the screw housing 35.

The conical screw 29 conveys the compacted straw supplied through the intake opening 47 to the discharge opening where it is packed by the ensuing die 45 and compacted at high pressure. The compaction raises the temperature of the straw cake until it bakes it to a compact briquet material which shall be mechanically strong following the later cooling. Because the compacted straw is driven by the conical screw 29 not only in the direction of conveyance but also is rotated at least partly about the screw axis 31, the helically mounted ribs 53 reinforce the conveyance effect because they drive it like a screw in the direction of conveyance on account of the winding direction opposite that of the screw coil 51. In particular the ribs reinforce the transfer of the compacted straw in the region of the discharge opening 41 into the essentially cylindrical discharge duct 61 formed by an opening 57 in the venting ring 43 and a die-pipe 59 of the die 45. In the process the ribs 53 prevent undesired clogging of the discharge opening 41.

The heating of the compacted straw in the compacting chamber 33 is so strong that—especially in the region of the discharge opening 41—water vapor may form from the drying water and might lead to excess-pressure damage in the equipment, but in particular it might explosively expel the straw compacted in the die-pipe 59. To prevent such an eventuality, a plurality of circumferentially distributed venting slits 43 are present at the venting ring 43 adjoining the discharge opening 41. The venting slits 63 are capillaries with a width if the order of 1/10 mm and they extend over the entire length of the venting ring 43. The venting slits 63 are open radially inward toward the opening 57 and issue into drain ducts 65 located radially above, said drain ducts flaring like wedges toward the conical screw compactor 27 and issuing at the end face of the venting ring 43 into a ring duct 67 open toward the ambient. Illustratively the venting slits 63 and the drain ducts 65 may be worked by spark machining into the venting ring 43. The venting ring 43 is more easily manufactured as a separate part and is seated in a chamber 69 open toward the screw housing 35 and containing the foot part 71 of the die 45 affixing the die-pipe 59 to the screw housing 35.

To make adjustable the discharge cross-section of the die 45, the die-pipe 59 is provided with an outer surface 73 conically flaring toward the conical screw compactor 27 and divided by a plurality of circumferentially distributed axial slits 75 into a number, here eight, of radially elastic tongues 77. The outside cone of the die-pipe 59 is enclosed by two clamping rings 79, 81 connected by adjustable spacer bolts 83 into a unit displaceable along the die-pipe 59. The clamping ring 79 supports a radially projecting ring flange 85 guided by several, here three, circumferentially offset guide rods 87 projecting from the foot part 71. Sets of cup springs 89 are guided along guide rods 87 on the side of the annular flange 85 that is axially away from the foot part 71 and are braced between the annular flange 85 on one hand and the screw heads 91 of the guide rods 87 on the other. The conical surface 73 of the die-pipe 59 and the clamping rings 79, 81 form a selflocking cone linkage for the radial pressure in the die-pipe 59, the sets of cup springs 89 pre-stressing the clamping rings 79, 81 toward the closing direction of the die-pipe 59. The multiplication effect of the cone linkage suffices to close the die-pipe 59 against the pressure from the compacted straw. To open the die-pipe 59, several, here three, mutually offset hydraulic piston-cylinder units 93 are provided at the foot part 71 which rest on the annular flange 85 and force the clamping rings 79, 81 against the force of the sets of cup springs 89 toward the tapered end of the conical surface 73. At comparatively little hydraulic effort it is possible in this manner to control the discharge cross-section of the die 45. This control may be automated if, as shown in FIG. 1, by means of a switch 95 responding to the drive torque of the conical screw 29, the hydraulic pressure is raised when the drive torque of the cylinders 93 increases and accordingly the compression of the conical screw compactor 27 rises beyond a pre-determined value or drops below it, when the drive torque and hence the compression drops below the predetermined value.

The straw heated by the compression from the conical screw compactor 27 cools during its ejection through the discharge duct 61 into a briquet string cut into pieces at the exit of the die 45 by means of suitable tools such as a saw or the like. The length of the die-pipe 59 can be shortened by providing the individual tongues 77 with axially extending cooling-water ducts 97. In similar manner cooling-water ducts 99 illustratively may be provided at the outer periphery of the venting ring 43. The IN and OUT lines for the cooling-water ducts 97, 99 are omitted for simplicity.

Figure 6:
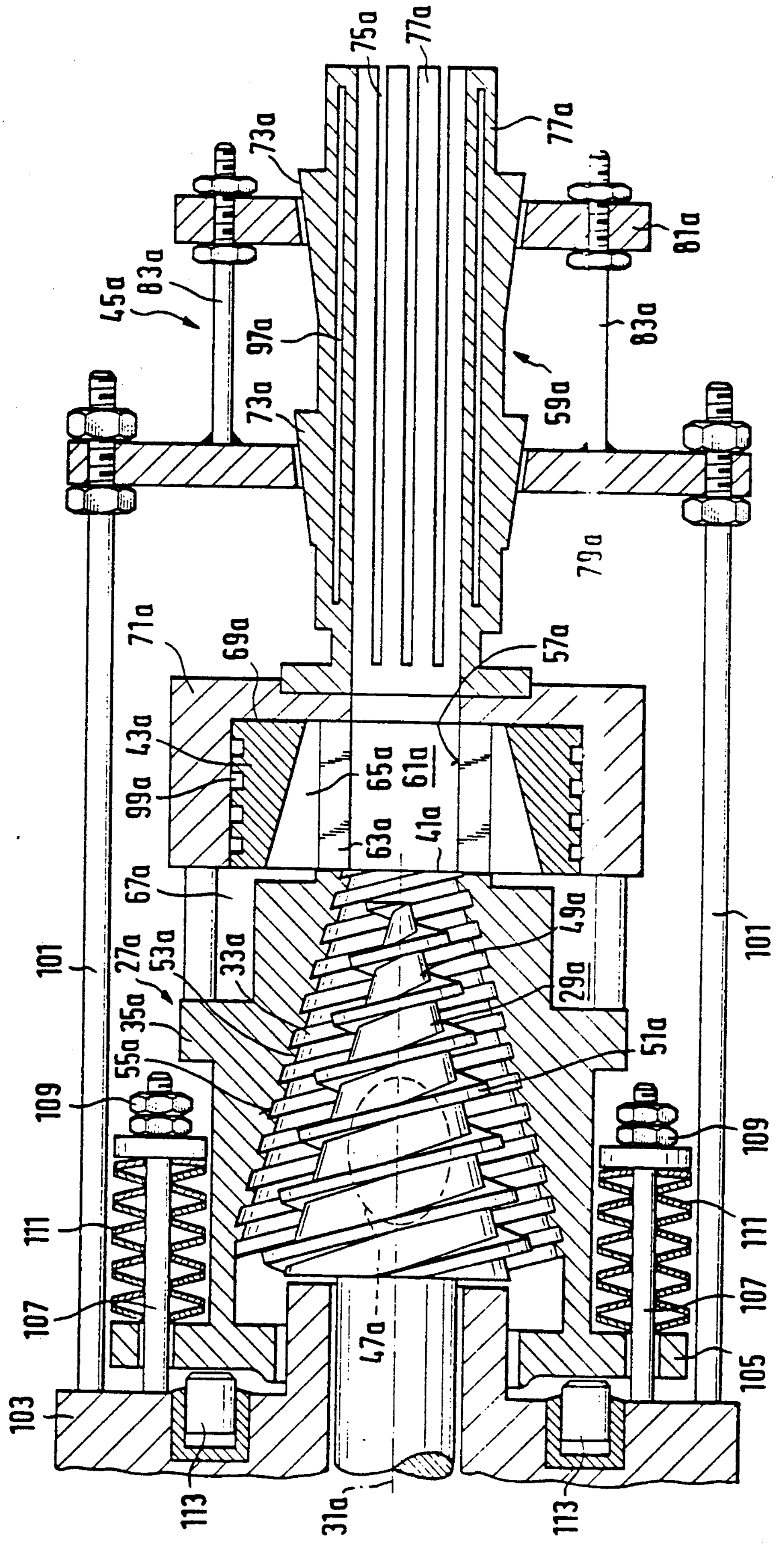
FIG. 6 is a sectional elevation of part of another embodiment of equipment for briqueting stalk-plant material, in particular straw.

FIG. 6 shows a variation of straw briqueting equipment which differs essentially from that of FIGS. 1 through 5 only by the kind of control of the discharge pressure of the conical screw compactor. Components with the same functions are shown in FIG. 1 with the same references as in FIGS. 1 through 5 but for differentiation are provided with the letter "a". The design and function of these components was described in relation to FIGS. 1 through 5 and reference is made to such description.

Whereas in the equipment of FIGS. 1 through 5 the clamping rings 79, 81 joined into a unit are displaceable relative to the conical surface 73 of the die-pipe 59, and the conical pipe 59 is rigidly joined by means of the foot part 71 and the screw housing 35 to the equipment machine base, in the equipment of FIG. 6, the clamping rings 79*a* and 81*a* joined into a unit by spacer bolts 83*a* are affixed in stationary manner by means of spacer bolts 101 to the machine base indicated at 103 and supporting the conical screw 29*a*. The die-pipe 59*a* is mounted by means of its foot part 71*a* receiving the venting ring 43*a* to the screw housing 35*a* of the conical screw compactor 27*a* and together with the foot part 71*a* and the screw housing 35*a* forms a unit displaceable in the direction of the screw axis 31*a* relative to the machine base and hence relative to the clamping rings 79*a* and 81*a*. This unit comprises a radially outwardly projecting annular flange 105 which in this case is mounted to the screw housing 35*a* and which is guided in displaceable but irrotational manner along several circumferentially mutually offsettable rods 107. The guide rods 107 axially projecting from the machine base 103 support at their free ends screw-heads 109 and guide sets of cup springs 111 braced between the annular flange 105 and the screw heads 109 and they pre-stress the unit of screw housing 35*a* and die-pipe 59*a* opposite the direction of conveyance of the conical screw 29*a* toward the machine base. In the illustrative embodiment of FIG. 6, instead of a continuous conical surface, the clamping rings 79*a*, 81*a* are associated with two conical surface segments 73*a* which are consecutive while forming a step. The conical surface segments 73*a* taper toward the conical screw compactor 27*a*, whereby the sets of cup springs 111 again pre-stress the die 41*a* toward the direction of closing. During the motion of the die-pipe 59*a* toward the conical screw 29*a* to close the discharge cross-section however, not only will the discharge cross-section of the die 45*a* be decreased, but also the radial distance between the conical screw 29*a* and the inside conical surface 55*a* of the screw housing 35*a*. As the distance decreases, the compression exerted by the conical screw 29*a* also increases. Contrary to the case of the embodiment of FIGS. 1 through 5, the pressure in the compacting chamber 33*a* need not gradually build up on account of the packing of the die 45*a*.

To relieve the compression chamber 33*a*, several circumferentially mutually offset hydraulic piston-cylinder units 113 are provided at the machine base 103 and rest on the annular flange 105 and displacing the unit consisting of the screw housing 35*a*, venting ring 43 and die-pipe 59*a* against the force of the sets of cup springs 111. On account of this relative motion, the discharge cross-section of the die 45*a* is enlarged on one hand and on the other hand the screw housing 35*a* is removed from the conical screw 29*a*. As a result on one hand the packing effect of the die 45*a* is reduced and on the other hand immediate pressure decrease takes place in the compaction chamber 33*a*. The sets of cup springs 111 and the cylinder-piston units 113 correspond with respect to their function those of the components 89 and 93 of the embodiment of FIGS. 1 through 5.

Again the screw housing 35*a* is provided on its inside conical surface 55*a* with ribs 53*a* helically enclosing the conical screw 29*a* in the form of a single- or multi-winding coil and extending beyond the conical screw 29*a* as far as the discharge opening 41*a*. The direction of winding of the ribs 53*a* is opposite that of the screw coil 51*a*, so that the conveyance by the conical screw 29*a* is reinforced especially in the region of the discharge opening 41*a*. In addition, as regards the embodiment of FIG. 6, the pumping effect produced by the axial motion between the conical screw 29*a* and the screw housing 35*a* additionally contributes to preventing undesired clogging in the vicinity of the discharge opening 41*a*.

Figure 7:
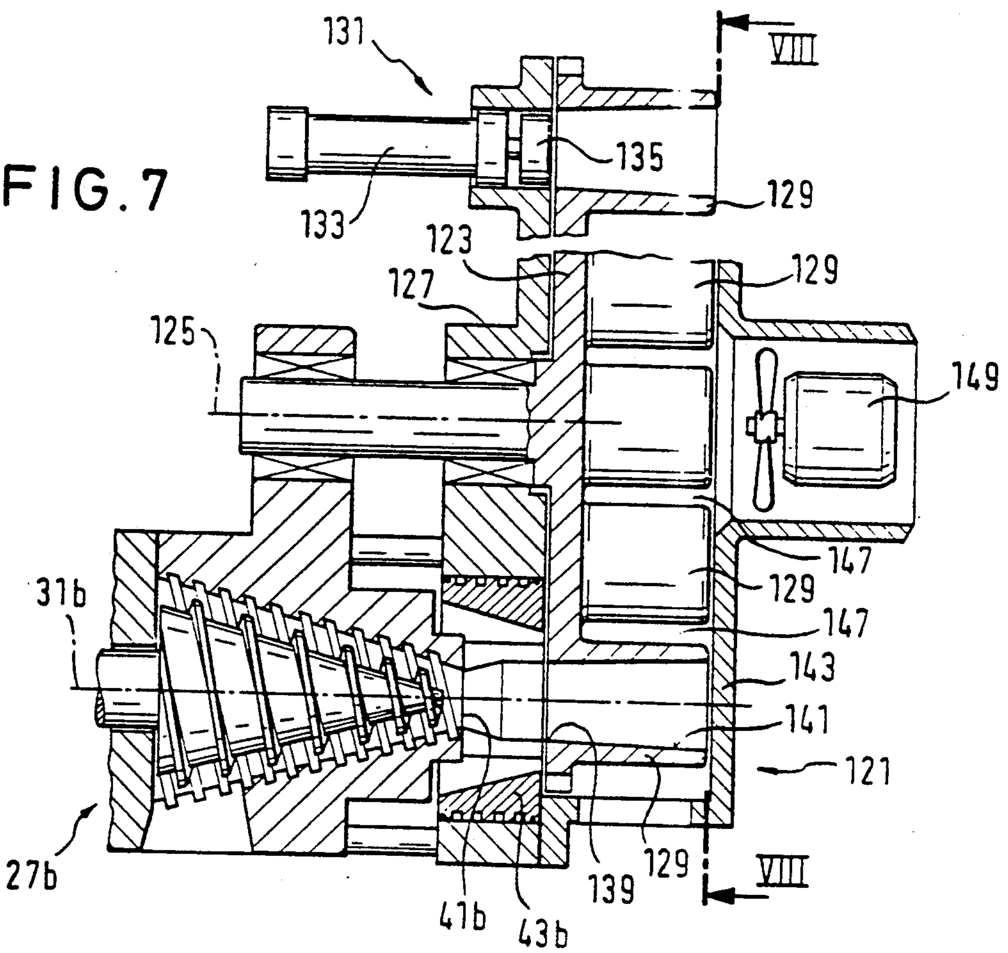
FIG. 7 is a sectional elevation of part of another embodiment of equipment for briqueting stalk-plant material, especially straw.
Figure 8:
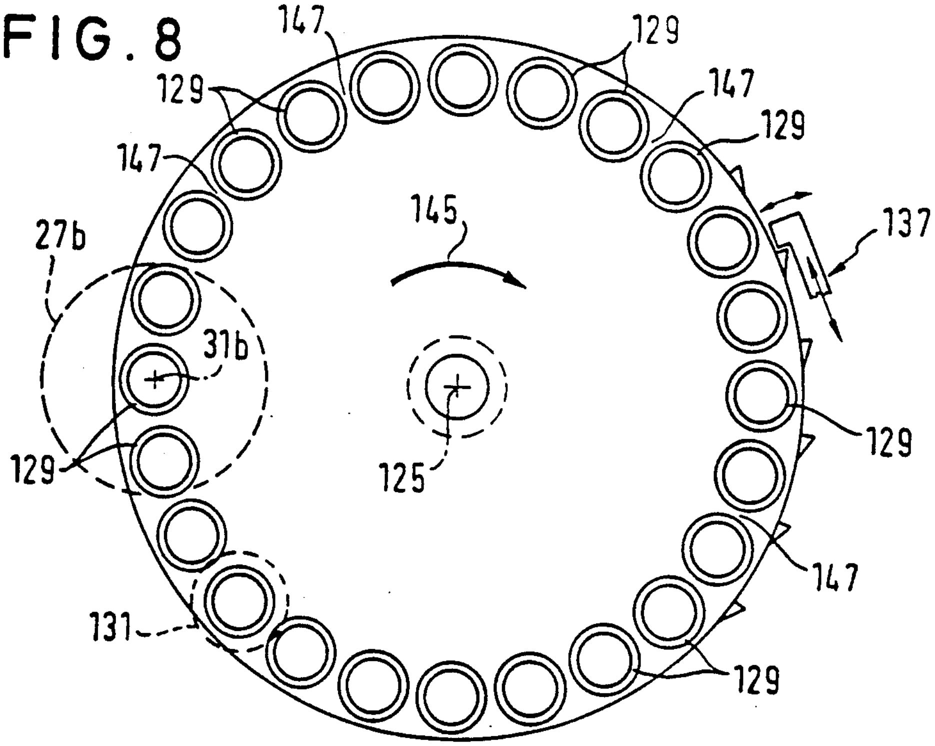
FIG. 8 is a partial cross-section of the equipment along a line VIII—VIII of FIG. 7.

FIGS. 7 and 8 show a variation of straw briqueting equipment which, contrary to the case of the equipment shown in FIGS. 1 through 6, namely with a single die-pipe of controlled cross-section, evinces a revolving die 121. The revolving die 121 replaces the die 45 of the briqueting equipment of FIGS. 1 through 5. Components with the same function are denoted by the references used in FIGS. 1 through 5 and are characterized additionally by the letter "b". These components already were discussed in relation to FIGS. 1 through 5.

The revolving die 121 immediately adjoins a venting ring 43*b* of the kind already discussed above which in turn follows the discharge opening 41*b* of the conical screw compactor 27*b*. The conical screw compactor 27*b* corresponds to the design of the compactor 27 of FIGS. 1 through 5. The revolving die 121 comprises a turret 123 rotatably supported about an axis of rotation 125 parallel to the screw axis 31*b* on a machine frame 127. A plurality of die-pipes are mounted in circumferentially offset manner in a circle around the axis of rotation 125 and parallel to same in such a way that each time one of the die-pipes 129 is aligned with the discharge opening 41*b* whereas simultaneously another die-pipe 129 is aligned with a discharge station 131 wherein a plunger 135 driven by a hydraulic cylinder 133 can empty the die-pipe. A ratchet stepping system schematically indicated at 137 and directly acting on the turret 123 moves the die-pipes 129 in consecutive order through the position aligned with the discharge opening 41*b* where the screw compactor 27*b* moves compacted material into the die-pipe 129 and thereafter into the expulsion station 131. The opening-edge 139 of each die-pipe 129 facing the venting ring 43*b* forms an annular blade which together with a matching blade formed by the venting ring 43*b* shears off the compacted string of material during the step-wise rotation of the turret 123. The individual die-pipes 129 evince an inside surface 141 slightly flaring in the expulsion direction of the expulsion station 131 in order to facilitate the expulsion of the briquet already compressed by the die-pipe 129 into its final shape. At least as regards the position axially opposite the discharge opening 41*b*, a closing wall 143 affixed to the machine frame closes the die-pipes consecutively moved through this position.

The briquets formed in the die-pipes 129 are cooling while the die-pipes 129 are moved from the position determined by the discharge opening 41*b* of the conical screw compactor 27*b* into the position determined by the expulsion station 131. As seen in the direction of rotation 145 (FIG. 8), the expulsion station 131 is as far as possible from the filling position determined by the screw compactor 27*b* in order to achieve the longest possible cooling time. The number of die-pipes 129 located between the filling position and the expulsion position as seen in the direction of rotation 145 therefore shall be as large as possible compared with the remaining die-pipes, ie those in the opposite direction, between those two positions.

The die-pipes 129 are circumferentially spaced apart and between themselves bound radial cooling-air apertures 147 through which a blower 149 mounted coaxially with the axis of rotation 125 moves cooling air radially from the inside to the outside.

The above discussed revolving die 121 being able to operate with comparatively short die-pipes 129 may also be used without the above venting ring 43*b*. The turret 123 in that case essentially adjoins directly the discharge opening 41*b* of the conical screw compactor 27*b*.

I claim:

1. Equipment for briqueting plant stalk-produce, comprising:

a conical-screw compactor (27) with a rotatably driven screw (29) evincing, at least at its front end as seen in the direction of feed, an external contour tapering conically in the feed direction and determined by several windings of at least one screw coil (51) projecting from a conical screw shank (49) and with a screw housing (35) that forms a conical compactor space (33) entered by the screw (29), the compactor space (33) comprising an inside conical surface (55) with at least one stalk-produce guide-strip (53) projecting toward the screw (29), the guide-strip (53) enclosing the screw (29) in the manner of a conical coil with a direction of its windings opposite to the direction of the windings of the screw (29), a discharge aperture (41) for the compacted stalk-produce being present at the tapered end of the inside conical surface, a tubular press-cavity (45) connected to the screw housing (35) and, following, as seen in the direction of feed coaxially with the conical axis (31) of the conical screw (29), the discharge aperture (41) of the compactor space (33), said press cavity (45) comprising several radially displaceable tongues (77) which are mutually displaceable by a hydraulic adjustment drive (93; 113) for the purpose of changing the discharge cross-section of a compression-cavity pipe (59) of the press-cavity (45), annular degassing means (43) adjoining the discharge aperture of the compactor space (33), with a plurality of narrow, axial degassing slits (63) open to the atmosphere, which issue into the discharge aperture of the compactor space (33), control means including a molding pressure sensor (95) associated with the conical screw compactor (27), said means so controlling the adjustment drive (93; 113) as a function of the molding pressure sensor (95) that the discharge cross-section of the compression-cavity pipe (59) is enlarged and narrowed respectively when reference molding pressure values are being crossed upward and downward.

2. The apparatus according to claim 1, wherein said conical surface of the screw housing extends beyond said rotating screw in the direction of feed and said guide strip extends into a region of the inside conical surface that is beyond said rotating screw.

3. The apparatus according to claim 1, wherein said guide strip reaches as far as said discharge opening.

4. The apparatus according to claim 1, wherein several guide strips jointly form a plurality of conical coils.

5. The apparatus according to claim 1, wherein said rotating screw of the conical screw compactor is substantially conical over the length of said rotating screw and said conical screw compactor, by means of an intake opening in said screw housing, directly adjoins a screw pre-compactor having a transverse axis and which is perpendicular to a screw axis of said conical screw compactor.

6. The apparatus according to claim 5, further comprising a pre-compressing roll assembly with at least two oppositely rotating compression rolls having axes which are mutually parallel and parallel to said screw axis of the screw pre-compactor and which pre-compress the stalk plant material between the rolls and inserting said material into an intake opening of said screw pre-compactor transversely to the screw axis thereof, said pre-compressing roll assembly being mounted on that side of said screw pre-compactor where said discharge opening of the conical screw compactor is located.

7. The apparatus according to claim 6, where said pre-compression rolls are superposed and an upper pre-compression roll is elastically pre-stressed toward a lower pre-compression roll.

8. The apparatus according to claim 6, further comprising a conveyor belt mounted on the side of said pre-compression roll assembly away from said screw pre-compactor and a rotating strip impact roll mounted with its axis parallel to said pre-compression roll assembly, adjacent thereto and above the conveyor belt.

9. The apparatus according to claim 1, further comprising a die disposed adjacent said discharge opening, wherein said die comprises a chamber open toward said conical screw compactor on the side of its die-pipe facing said conical screw compactor, said chamber receiving the annular degassing means and together with said die being affixed to said screw housing of the conical screw compactor.

10. The apparatus according to claim 9, further comprising several cooling-water ducts being present in a circumferentially distributed manner both in a region of said annular degassing means and in a region of said die.

11. The apparatus according to claim 9, wherein said die has a die-pipe provided on the outside thereof with wedge-surfaces and is divided by said axial slots into said radially displaceable tongues of which the radial spacing is determined by at least one common clamping ring enclosing the wedge surfaces, and wherein said at least one clamping ring and the die-pipe are axially displaceable relative to each other and are pre-stressed by springs toward each other, and are moved by said adjustment drive toward each other against a pre-stressing force of said pre-stressed springs.

12. The apparatus according to claim 11, wherein said prestressed springs pre-stress said clamping ring and said die-pipe toward each other in the sense of constricting a discharge cross-section of said die.

13. The apparatus according to claim 12, wherein said die-pipe is rigidly joined to said screw housing of the conical screw compactor and said wedge-surfaces taper away from said screw housing, said clamping ring comprises a radially projecting rest flange and several tension rods axially parallel to said die-pipe and which are rigidly joined to said screw housing, said prestressed springs are guided along the tension rods and are clamped between the rest flange and a head at the end of each of said tension rods away from the screw housing.

14. The apparatus according to claim 11, wherein said screw housing and said die-pipe form a sub-assembly guided displaceably relative to the rotating screw of the conical screw compactor toward the screw axis along a machine base supporting the rotating screw, said clamping ring is rigidly joined to a machine base and said pre-stressed springs are clamped between said sub-assembly and said machine base.

15. The apparatus according to claim 14, wherein said sub-assembly comprises a radially projecting rest flange and several tension rods axially parallel to the screw axis and being located around said sub-assembly, rigidly joined to said machine base and wherein said springs are guided along the tension rods and are clamped between the rest flange and a head at the end of each of the tension rods far from said machine base.

16. The apparatus according to claim 11, wherein several clamping rings, mutually offset in the axial direction of said die-pipe, are combined into one assembly.

17. Equipment defined in claim 1, wherein the axial, narrow slits (63) merge into radially opposite, axial, wider drain ducts (65) which are open to the atmosphere at one end face of the annular degassing means (43).

18. The apparatus according to claim 17, wherein said drain ducts axially issue into a ring duct of the screw housing of the conical screw compactor.

19. The apparatus according to claim 17, wherein said drain ducts are wedge-shaped and axially taper away from said conical screw compactor.

20. The apparatus according to claim 1, wherein said pressure sensor responds to a drive torque of said rotating screw of the conical screw compactor.

21. The apparatus according to claim 17, wherein said drain ducts axially issue into a ring duct of the screw housing of the conical screw compactor.

22. The apparatus according to claim 17, wherein said drain ducts are wedge-shaped and axially taper away from said conical screw compactor.

23. Equipment for briqueting plant stalk-produce, comprising:

a conical screw compactor with a rotatably driven screw evincing, at least at its front end as seen in the direction of feed, a conically tapering outer contour determined by several windings of at least one screw coil projecting from a conical screw shank and with a screw housing forming a conical compactor space entered by the screw, the compactor space evincing an inside conical surface with at least one stalk-produce guide-strip projecting toward the screw, said guide strip enclosing the screw in the form of a conical coil with a direction of its windings opposite to that of the windings of the screw, a discharge aperture for compacted plant-stalk produce being present at the tapered end of the inside conical surface, a turret compression-cavity mounted in front of the discharge aperture, with compression-cavity pipes of said turret compression-cavity mounted on a common, rotatably supported turret head and are individually pointed in sequence toward the discharge aperture, and an annular part mounted between the discharge aperture of the compactor space and the turret compression-cavity, where a plurality of axial, narrow degassing slits open to the atmosphere issue on the inside surface of said annular part, wherein said compression cavity pipes are mounted circumferentially spaced apart on the turret and between themselves form radially open cooling-air gaps, and wherein a cooling-air blower is provided which moves cooling air from the radial inside to the radial outside through the cooling air gaps.

* * * * *